United States Patent
Johannesson et al.

(10) Patent No.: US 8,351,973 B2
(45) Date of Patent: Jan. 8, 2013

(54) SHORT MESSAGE SERVICE (SMS) OVER SERVICE ACCESS POINT IDENTIFIER 0 (SAPI-0)

(75) Inventors: Regina Johannesson, Lund (SE); Anne-Lott Hedberg, Lund (SE); Paul Schliwa-Bertling, Ljungsbro (SE); Karl Hellwig, Wonfurt (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 285 days.

(21) Appl. No.: 12/482,772

(22) Filed: Jun. 11, 2009

(65) Prior Publication Data

US 2009/0311988 A1    Dec. 17, 2009

Related U.S. Application Data

(60) Provisional application No. 61/061,262, filed on Jun. 13, 2008, provisional application No. 61/083,259, filed on Jul. 24, 2008.

(51) Int. Cl.
*H04B 7/00* (2006.01)

(52) U.S. Cl. .................... 455/521; 455/404.1

(58) Field of Classification Search .......... 455/466, 455/404.1, 404.2, 521, 415, 569.2, 99, 152.1; 340/901, 902, 904
See application file for complete search history.

(56) References Cited

U.S. PATENT DOCUMENTS

| | | | |
|---|---|---|---|
| 6,631,274 B1 * | 10/2003 | Keshavachar | 455/466 |
| 7,336,630 B2 * | 2/2008 | Hamalainen et al. | 370/329 |
| 2004/0048627 A1 * | 3/2004 | Olvera-Hernandez | 455/466 |
| 2007/0218925 A1 * | 9/2007 | Islam et al. | 455/466 |
| 2007/0287409 A1 * | 12/2007 | Hwang | 455/404.1 |
| 2008/0045250 A1 * | 2/2008 | Hwang | 455/466 |
| 2009/0075703 A1 * | 3/2009 | Furbeck | 455/569.2 |
| 2009/0156201 A1 * | 6/2009 | Pudney et al. | 455/426.1 |
| 2009/0156237 A1 * | 6/2009 | Hwang | 455/466 |
| 2009/0227225 A1 * | 9/2009 | Mitchell et al. | 455/404.2 |
| 2009/0304058 A1 * | 12/2009 | Leung et al. | 375/222 |

OTHER PUBLICATIONS

European e-Call functional specifications in Vehicle System; Working Document; Vehicle Functionality Working Group (ECIV); Dr. W. Reinhardt, ACEA; Version 1.1; Oct. 4, 2006; http://www.esafteyoffice.org/download/ecall_toolbox/_Reports/Appendix_10.pdf, chapter 2.1, figure 9 (14 pages).

Proposed MSD content for eCall; DG eCall; Version1.0; Sep. 3, 2007, 8 pages; http://www.kokom.no/kokomsoek/20070312%20eCall_MSD_Content_v2%20(2).pdf, chapter 2.2 (8 pages).

(Continued)

*Primary Examiner* — Michael Faragalla
*Assistant Examiner* — William Lu
(74) *Attorney, Agent, or Firm* — Myers Bigel Sibley & Sajovec

(57) ABSTRACT

A mobile station receives data for sending to a destination device and determines whether to send the data to the destination device via either short message service (SMS) over service access point identifier 0 (SAPI-0) or SMS over SAPI-3, where SAPI-0 and SAPI-3 comprise different service access points associated with a data link layer of a mobile network. The mobile station selectively sends the location information to the destination device via either SMS over SAPI-0, or via SMS over SAPI-3, based on the determination.

19 Claims, 6 Drawing Sheets

OTHER PUBLICATIONS

3$^{rd}$ Generation Partnership Project; Technical Specification Group GSM EDGE Radio Access Network; Data Link (DL) Layer; General aspects (Release 7); 3GPP TS 44.005 V7.0.0 (Nov. 2005) http://www.3gpp.org/ftp/Specs/html-info/44-series.htm, chapter 4.2.2, chapter 5.2, chapter 6.1, (19 pages).

3$^{rd}$ Generation Partnership Project; Technical Specification Group Core Network and Terminals; Mobile radio interface Layer 3 specification; Core network protocols; Stage 3 (Release 8); 3GPP TS 24.008 V8.1.0 (Mar. 2008) http://www.3gpp.org/ftp/Specs/html-info/24-series.htm, 551 pages.

3$^{rd}$ Generation Partnership Project; Technical Specification Group GSM EDGE Radio Access Network; Mobile Station—Base Station System (MS—BSS) interface; Data Link (DL) layer specification (Release 7); 3GPP TS 44.006 V7.0.0 (Jun. 2007) http://www.3gpp.org/ftp/Specs/html-info/44-series.htm, 60 pages.

3$^{rd}$ Generation Partnership Project; Technical Specification Group Services and System Aspects; eCall data transfer; In-band modem solution (Release 8); 3GPP TR 26.967 V8.0.1 (Dec. 2007) http://www.3gpp.org/ftp/Specs/html-info/26-series.htm, 26 pages.

3$^{rd}$ Generation Partnership Project; Technical Specification Group Services and System Aspects; Transferring of emergency call data (Release 7); 3GPP TR 22.967 V7.0.0 (Mar. 2006) http://www.3gpp.org/ftp/Specs/html-info/22-series.htm, 24 pages.

3$^{rd}$ Generation Partnership Project; Technical Specification Group Services and System Aspects; Service aspects; Service principles (Release 8) 3GPP TS 22.101 V8.8.0 (Mar. 2008) http://www.3gpp.org/ftp/Specs/html-info/22-series.htm, 53 pages.

PCT International Search Report and Written Opinion corresponding to PCT/SE2009/050723, mailed Sep. 17, 2009.

* cited by examiner

SHORT MESSAGE SERVICE (SMS) OVER SERVICE ACCESS POINT IDENTIFIER 0 (SAPI-0)

CROSS REFERENCE TO RELATED APPLICATIONS

The instant application claims priority from provisional application No. 61/061,262, filed Jun. 13, 2008, and provisional application No. 61/083,259, filed Jul. 24, 2008, the disclosures of which are incorporated by reference herein in their entirety.

TECHNICAL FIELD

Implementations described herein relate generally to wireless communication systems and, more particularly, to the delivery of short message service (SMS) messages in wireless communications systems.

BACKGROUND

The Third Generation Partnership Project (3GPP) involves collaboration between groups of telecommunications associations to create a globally applicable 3G mobile phone system specification. The 3GPP standards are based on Global System for Mobile Communications (GSM) specifications and encompass standards for radio, core network and service architecture.

There is currently work ongoing within 3GPP to introduce a new service called eCall. eCall is an automatically or manually initiated emergency voice call supplemented by a Minimum Set of Data (MSD) that includes vehicle specific and high accuracy location information. Using this information, the emergency services can accurately locate and provide more rapid assistance to accident victims, thus, saving more lives. As with the emergency voice call, the integrity of the MSD sent from the vehicle to the Public Safety Answering Point (PSAP) has to be ensured. It is expected that the MSD will be sent either during the emergency voice call set-up or immediately following the establishment of the emergency voice call.

It has been proposed to deliver the MSD component of the eCall using in-band modem signaling. This solution, however, has a number of drawbacks. One such drawback is that the use of in-band modem signaling prohibits any modifications to the user plane in the network and, therefore, may eliminate the MSD component when sent in-band. As the knowledge about the in-band transmission of the MSD is not available along the transmission path in the network, the use of in-band modem signaling requires that no future changes to the handling of the user plane in the network will be allowed.

Another drawback to using in-band modem signaling, involves the delay jitter experienced in a packet-based (e.g., Internet Protocol (IP)) network. This delay jitter, which is prevalent in modem in-band signaling over the packet-based network, will impact the reliability of the MSD delivery. A further drawback is that the large amount of redundancy employed in modem in-band signaling, which is used to ensure reliable delivery, results in a very long delivery time.

SUMMARY

Exemplary embodiments described herein enable the delivery of the MSD using short message service (SMS) instead of using in-band signaling. In the current 3GPP specifications, an SMS is sent over service access point identifier 3 (SAPI-3) and, thus, is transmitted on the Slow Associated Control Channel (SACCH). Transmitting MSD over SACCH, however, will not fulfill the delay requirement specified in 3GPP TR 22.967, and does not provide for reliable delivery because the link on SAPI-3 may be dropped when mobility procedures (e.g., handover) are performed.

Thus, implementations described herein solve these problems by transferring MSD using SMS over SAPI-0 via the Fast Associated Control Channel (FACCH). The transfer of MSD using SMS over SAPI-0/FACCH outperforms in-band signaling. For example, a typical value of the MSD (e.g., 140 octets) can be transmitted using SMS over SAPI-0/FACCH within 2 seconds in good radio conditions and within 20 seconds in poor radio conditions. Additionally, using SAPI-0, instead of SAPI-3, ensures that the link is maintained during mobility procedures (e.g., handover) and that the Radio Link Control acknowledged mode is utilized. In another implementation, the MSD may be transferred to the PSAP using SMS over SAPI-0 via the Stand-alone Dedicated Control Channel (SDCCH).

Transferring MSD using SMS over SAPI-0 via FACCH/SDCCH enables a faster link (i.e., FACCH instead of SACCH) and provides for a reliable link (e.g., the link operates in acknowledged mode and is not reset at handover and assignment as for SAPI-3). Transferring MSD using SMS over SAPI-0 via FACCH further requires very few software changes in the mobile station and mobile switching center, requires very few changes in the 3GPP GSM standard, and is backwards compatible.

According to one aspect, a method implemented in a mobile station may include receiving, at a processing unit of the mobile station, data for sending to a destination device; and sending, via a transceiver of the mobile station, the data to the destination device via short message service (SMS) over service access point identifier 0 (SAPI-0) of a Global System for Mobile communications (GSM) mobile network, where SAPI-0 comprises a service access point associated with a data link layer of the GSM mobile network.

According to a further aspect, a mobile station may include a transceiver and a processing unit to: receive data for sending to a destination device, determine whether to send the data to the destination device via either short message service (SMS) over service access point identifier 0 (SAPI-0) or SMS over SAPI-3, where SAPI-0 and SAPI-3 comprise different service access points associated with a data link layer of a mobile network, and selectively send, via the transceiver, the location information to the destination device via either SMS over SAPI-0, or via SMS over SAPI-3, based on the determination.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Implementations described herein relate to transferring MSD associated with an eCall from a mobile station to a PSAP via SMS over SAPI-0. eCall as used herein may refer to an automatically or manually initiated emergency voice call supplemented by a MSD that includes vehicle specific and high accuracy location information. The MSD may include, among other types of data, a vehicle type (car/truck), a vehicle identification (make and model), a time, a geographic location of the vehicle, a direction the vehicle was traveling, and/or a number of passengers in the vehicle. In the 3GPP GSM standard, SAPI-0 represents a specific data link layer service access point at which the data link layer provides services to network protocol layer 3. SAPI-3 represents a different data link layer service access point than SAPI-0. As set forth in ETSI TS144 005, different logical control channels in 3GPP GSM support different SAPIs (i.e., some only support SAPI-0, some only support SAPI-3, and some support both SAPI-0 and SAPI-3). Further, different logical control channels support those SAPIs in different modes of operation (e.g., acknowledged, unacknowledged). In one implementation described herein, the MSD is transferred using SMS and SAPI-0 via the FACCH channel. In the 3GPP GSM standard, the FACCH is a reliable channel since it replaces ("steals") speech frames in the data channel and replaces them with other information (i.e., the MSD). FACCH may be used on demand and may result in reliable delivery in situations where delay in transmission is unacceptable.

Figure 1:
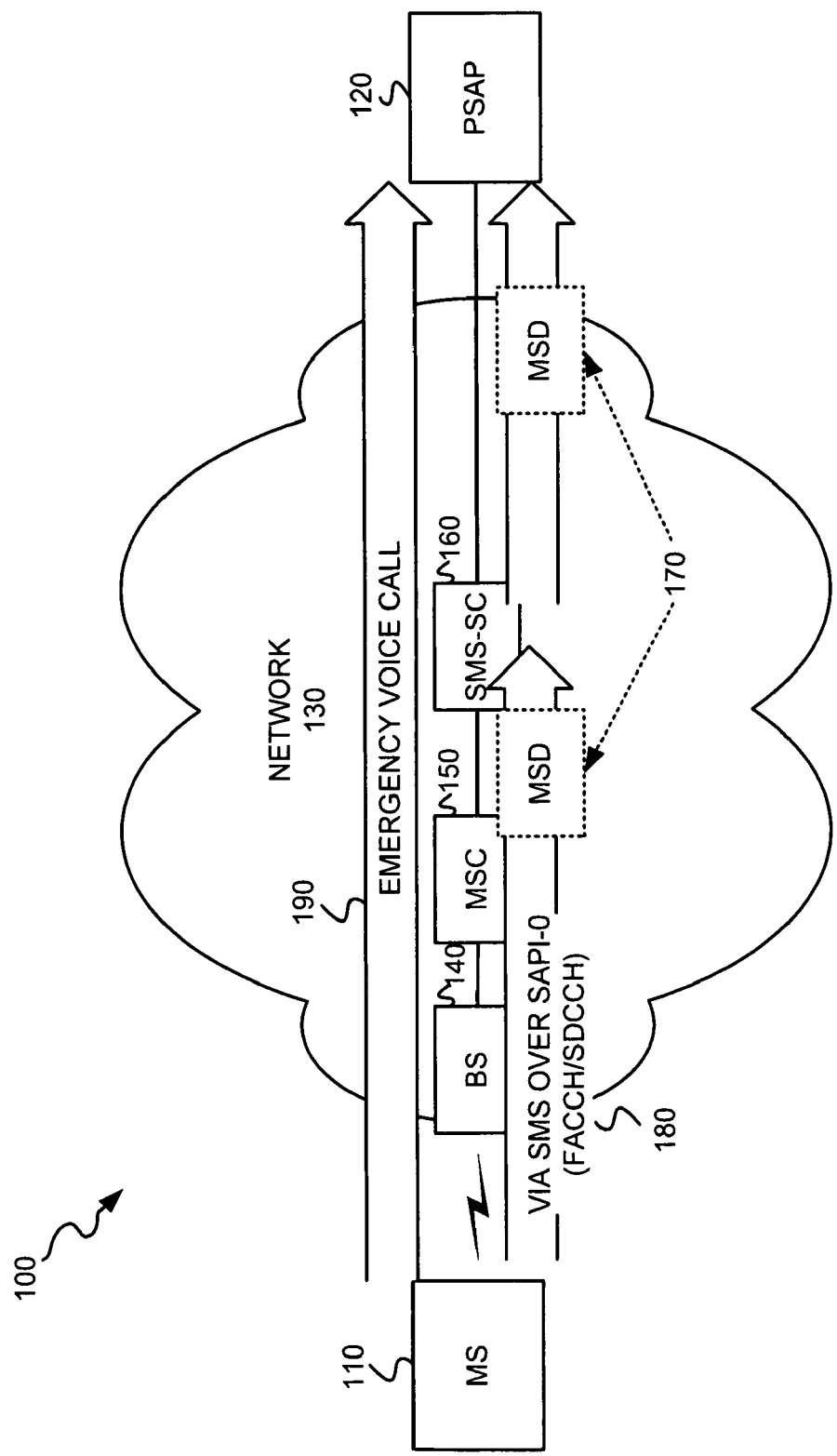
FIG. 1 illustrates an exemplary communications system in which devices, methods, and/or systems described herein may be implemented.

FIG. 1 illustrates an exemplary communications system 100 in which MSD may be transferred from a mobile station to a PSAP via SMS over SAPI-0 (FACCH) in conjunction with an emergency voice call. As shown in FIG. 1, system 100 may include a mobile station 110 and a Public Safety Answering Point (PSAP) 120 connected to a network 130. As further shown in FIG. 1, mobile station 110 may communicate with PSAP 120 via network 130 in system 100. In one implementation, mobile station 110 may communicate with one or more other devices that act as intermediate devices between mobile station 110 and PSAP 120. For example, as shown in FIG. 1, a base station (BS) 140 (e.g., a wireless station), a mobile switching center (MSC) 150, and a short message service (SMS) switching center (SMS-SC) 160 may reside as intermediate devices of network 130 and may be used to facilitate end-to-end SMS communication between mobile station 110 and PSAP 120. For example, as shown in FIG. 1, mobile station 110 may obtain MSD 170 and send the data via Short Message Service (SMS) 180 over SAPI-0, where SAPI-0 is specified in the 3GPP specifications. Mobile station 110 may further send the MSD 170 on either the FACCH or the SDCCH, when sending MSD 170 via SMS 180 over SAPI-0.

Other devices, not shown in FIG. 1, may be included in network 130 to permit mobile station 110 to communicate with PSAP. For example, though FIG. 1 depicts devices used to facilitate end-to-end SMS communication between mobile station 110 and PSAP 120 other devices (not all of which may be shown) may be used to facilitate an end-to-end voice call between mobile station 110 and PSAP 120. As shown in FIG. 1, mobile station 110, in conjunction with the sending of MSD 170 to PSAP 120, may communicate with PSAP 120 via an emergency voice call 190.

Mobile station 110 may include, for example, a cellular radiotelephone, a personal digital assistant (PDA), a Personal Communications Systems (PCS) terminal, a laptop computer, a palmtop computer, or any other type of device or appliance that includes a communication transceiver that permits mobile station 110 to communicate with other devices via a wireless link. The PCS terminal may, for example, combine a cellular radiotelephone with data processing, facsimile and data communications capabilities. The PDA may include, for example, a radiotelephone, a pager, an Internet/intranet access device, a web browser, an organizer, calendars and/or a global positioning system (GPS) receiver. Mobile station 110 may be referred to as a "pervasive computing" device. In some implementations, mobile station 110 may be associated with (e.g., contained within) a vehicle, such as, for example, an automotive vehicle.

Base station 140 may receive data from, or transmit data to, mobile station 110 via a wireless interface. For example, base station 140 may receive voice calls destined to, or received from, mobile station 110 via, for example, data channels over the wireless interface. Base station 140 may further receive MSD 170 via SMS over SAPI-0 180 via the FACCH or SDCCH logical control channels and may route the MSD 170 to PSAP 120 via MSC 150 and SMS-SC 160.

MSC 150 may route data received from mobile station 110 towards its destination and/or route data received from network 130 towards mobile station 110. As shown in FIG. 1, MSC 150 may route voice call 190 towards PSAP 120 and may further route MSD 170 via SMS over SAPI-0. SMS-SC 160 may receive MSD 170 sent via SMS over SAPI-0 and may deliver MSD 170 to PSAP 120 via SMS.

PSAP 120 may include a device associated with a call center that is responsible for answering calls to an emergency telephone number, such as, for example, police, firefighting and/or ambulance services. The device associated with PSAP 120 may receive voice call 190 from mobile station 110 via network 130 and may also receive MSD 170 via SMS over network 130. An operator at PSAP 120 may dispatch emergency services based on voice call 190 and MSD 170.

Network(s) 130 may include a mobile network, such as a Public Land Mobile Network (PLMN) or a satellite network, and possibly one or more other networks of any type, including a local area network (LAN); a wide area network (WAN); a metropolitan area network (MAN); a telephone network, such as a Public Switched Telephone Network (PSTN); an intranet, the Internet; or a combination of networks. The PLMN may further include a packet-switched sub-network, such as, for example, a General Packet Radio Service (GPRS), a Cellular Digital Packet Data (CDPD), or a Mobile IP network.

Figure 2:
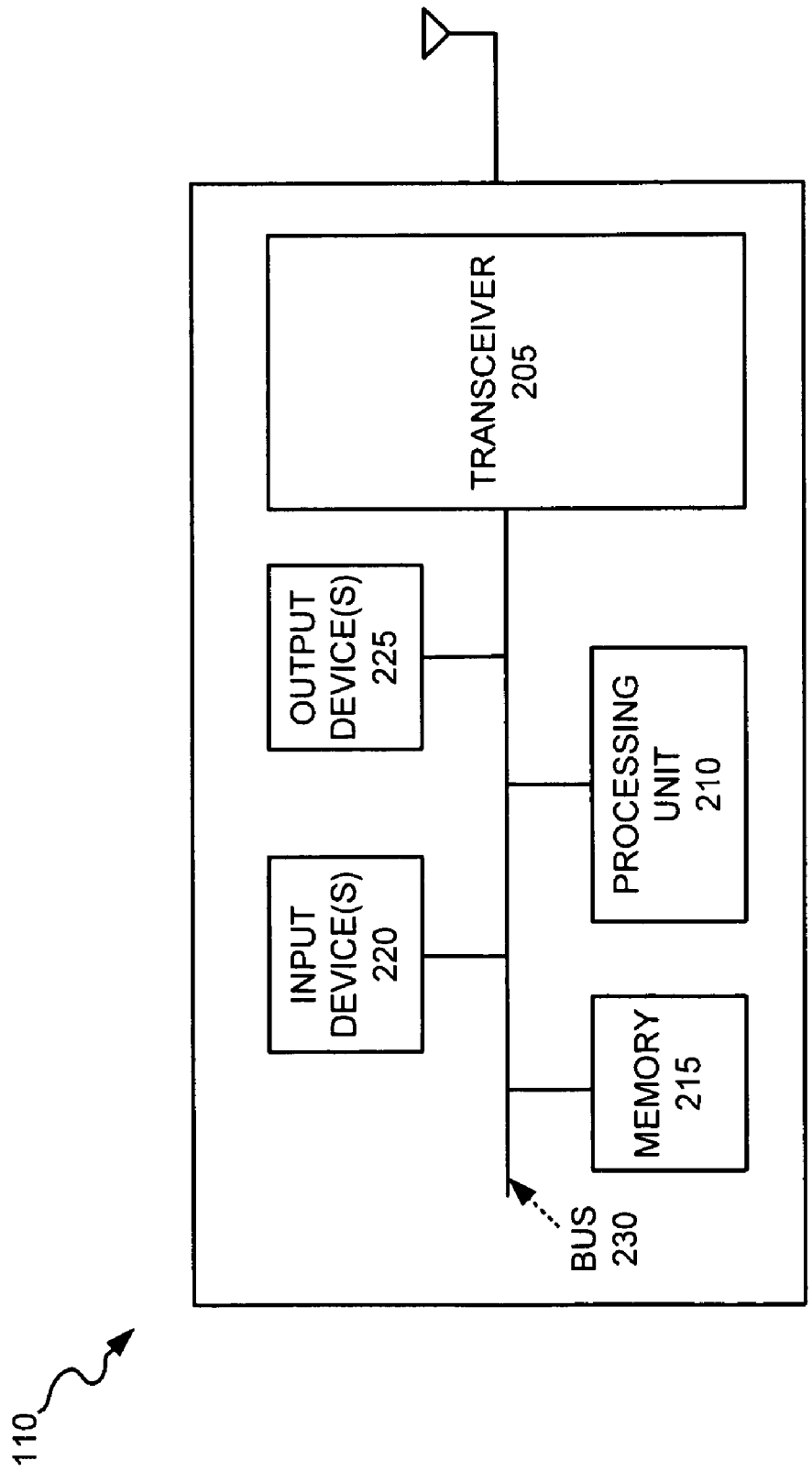
FIG. 2 illustrates exemplary components of the mobile station of FIG. 1.

FIG. 2 illustrates one exemplary implementation of mobile station 110. Base station 140 may be similarly configured. Mobile station 120 may include a transceiver 205, a processing unit 210, a memory 215, an input device(s) 220, an output device(s) 225, and a bus 230.

Transceiver 205 may include transceiver circuitry for transmitting and/or receiving symbol sequences using radio frequency signals via one or more antennas. Processing unit 210 may include a processor, a microprocessor, or processing logic that may interpret and execute instructions. Processing unit 210 may perform data processing functions for inputting, outputting, and processing of data including data buffering and device control functions, such as call processing control, user interface control, or the like.

Memory 215 may provide permanent, semi-permanent, or temporary working storage of data and instructions for use by processing unit 210 in performing device processing functions. Memory 215 may include read only memory (ROM), random access memory (RAM), large-capacity storage devices, such as a magnetic and/or optical recording medium and its corresponding drive, and/or other types of memory devices. Input device(s) 220 may include mechanisms for entry of data into device 110. For example, input device(s) 220 may include a key pad (not shown), a microphone (not shown) or a display unit (not shown). The key pad may permit manual user entry of data into device 110. The microphone may include mechanisms for converting auditory input into electrical signals. The display unit may include a screen display that may provide a user interface (e.g., a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 225 may include mechanisms for outputting data in audio, video and/or hard copy format. For example, output device(s) 225 may include a speaker (not shown) that includes mechanisms for converting electrical signals into auditory output. Output device(s) 225 may further include a display unit that displays output data to the user. For example, the display unit may provide a graphical user interface that displays output data to the user. Bus 230 may interconnect the various components of device 110 to permit the components to communicate with one another.

The configuration of components of mobile station 110 illustrated in FIG. 1 is for illustrative purposes only. Other configurations with more, fewer, or a different arrangement of components may be implemented. For example, mobile station 110 may include a location determining device (not shown), such as, for example, a GPS device that may be used to determine a location of mobile station 110 or to determine a location of a vehicle associated with mobile station 110.

Figure 3:
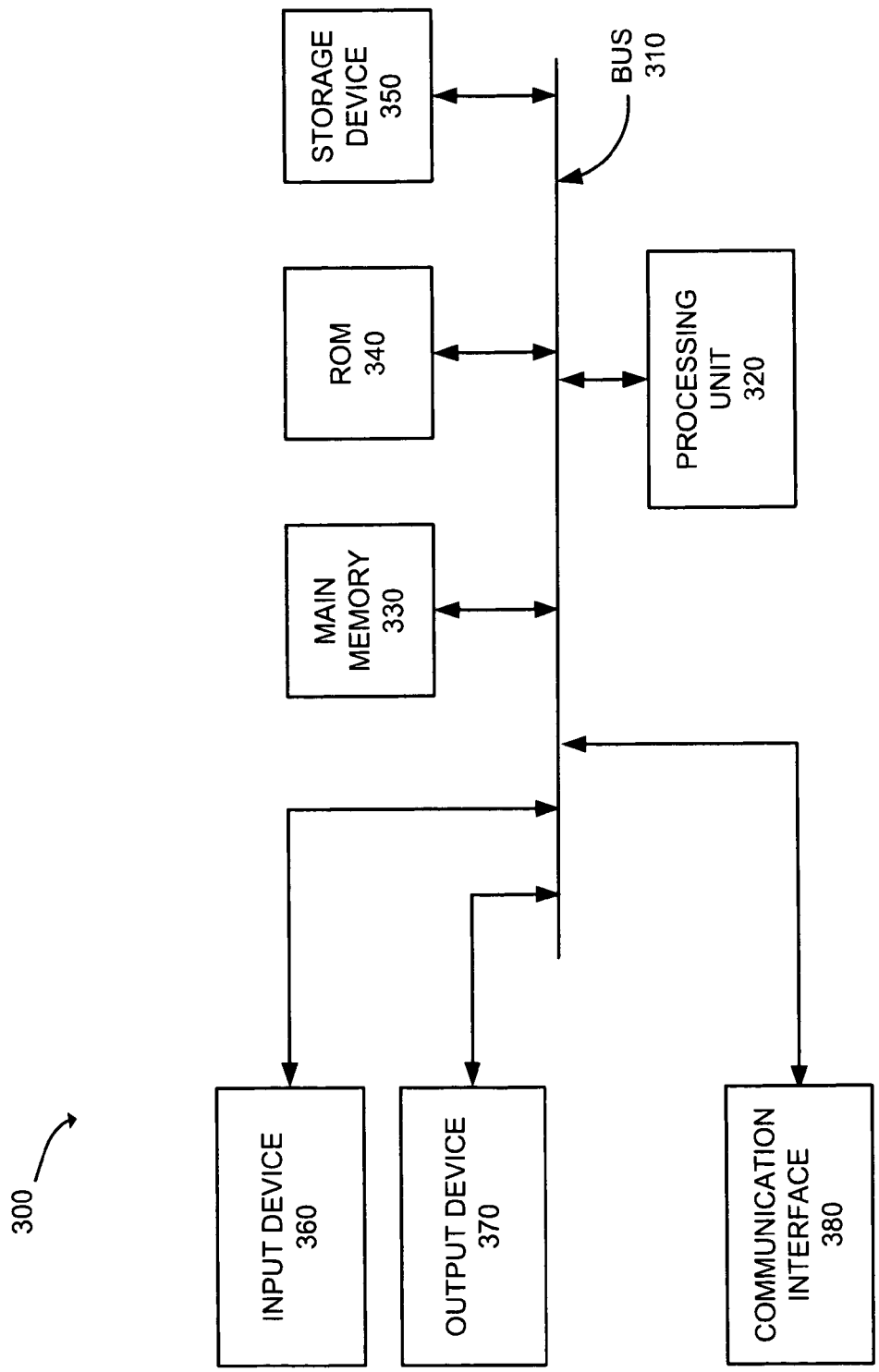
FIG. 3 illustrates exemplary components of a device that may correspond to the mobile switching center or short message service switching center of FIG. 1.

FIG. 3 is a diagram of a device 300, which may correspond to MSC 150, SMS-SC 160 and/or PSAP 120, according to an exemplary implementation. As illustrated, device 300 may include a bus 310, a processing unit 320, a main memory 330, a ROM 340, a storage device 350, an input device 360, an output device 370, and a communication interface 380. Bus 310 may include a path that permits communication among the components of device 300.

Processing unit 320 may include a processor, a microprocessor, or processing logic that may interpret and execute instructions. Main memory 330 may include a RAM or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device 360 may include a 1 mechanism that permits an operator to input information to device 300, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 130.

Device 300 may perform certain operations or processes described herein. Device 300 may perform these operations in response to processing unit 320 executing software instructions contained in a computer-readable medium, such as main memory 330, ROM 340, and/or storage device 350. A computer-readable medium may be defined as a physical or a logical memory device. For example, a logical memory device may include memory space within a single physical memory device or distributed across multiple physical memory devices. Each of main memory 330, ROM 340 and storage device 350 may include computer-readable media. The magnetic and/or optical recording media (e.g., readable CDs or DVDs) of storage device 350 may also include computer-readable media.

The software instructions may be read into main memory 330 from another computer-readable medium, such as storage device 350, or from another device via communication interface 380. The software instructions contained in main memory 330 may cause processing unit 320 to perform operations or processes described herein. Alternatively, hardwired circuitry may be used in place of or in combination with software instructions to implement processes and/or operations described herein. Thus, implementations described herein are not limited to any specific combination of hardware and software.

Figure 4:
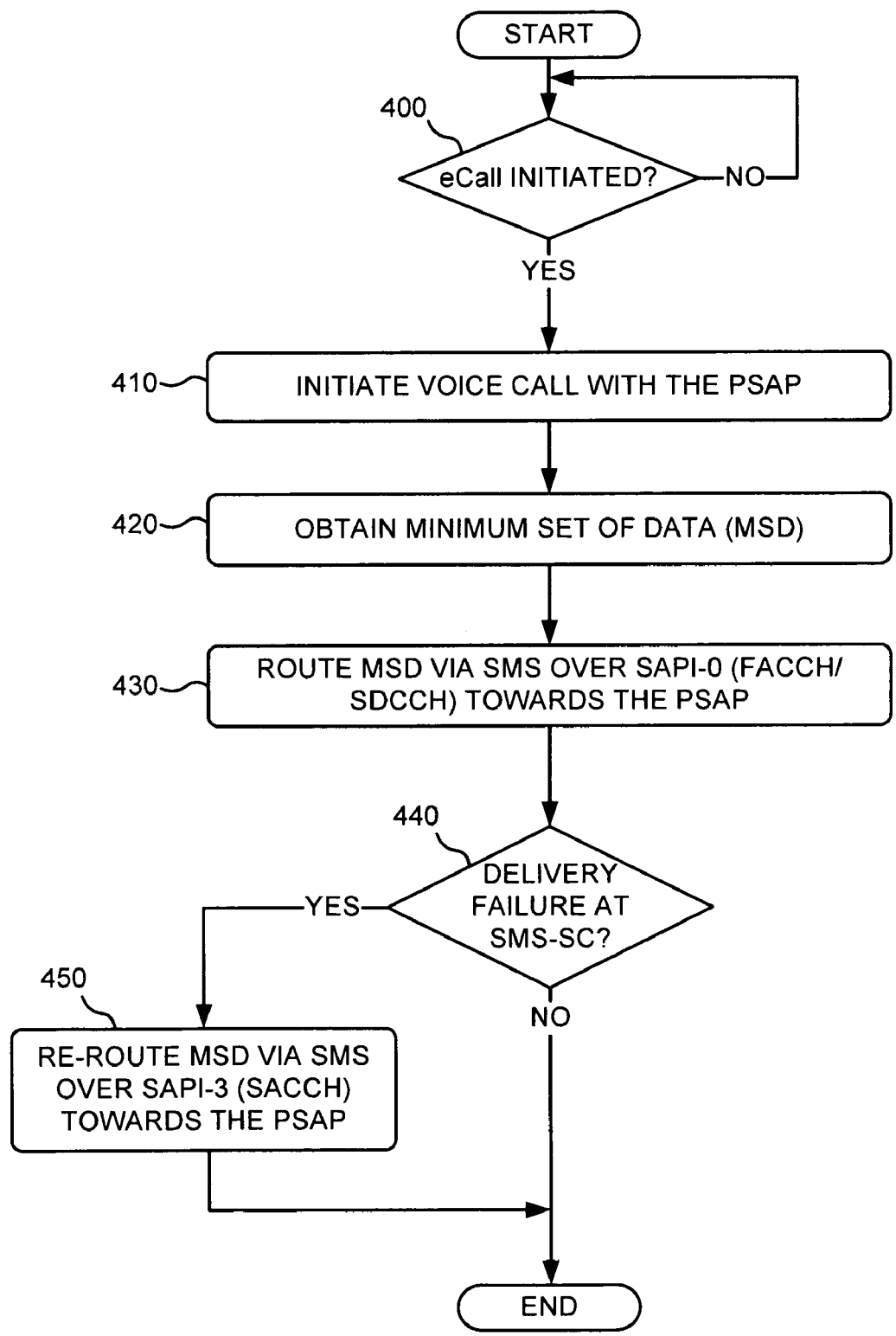
FIG. 4 is a flowchart that illustrates exemplary operations associated with sending MSD data via SMS over SAPI-0 during an eCall.

FIG. 4 is a flowchart that illustrates exemplary operations associated with sending MSD via SMS over SAPI-0 during an eCall. The exemplary operations of FIG. 4 may be performed by mobile station 110 in conjunction with BS 140, MSC 150 and SMS-SC 160.

The exemplary operations may begin with a determination of whether an eCall has been initiated (block 400). The eCall may be initiated manually (e.g., by a user dialing an emergency number) or automatically (e.g., eCall may be triggered automatically when a vehicle collision is sensed). If an eCall has not been initiated (NO—block 400), then the exemplary process may return to block 400. If an eCall has been initiated (YES—block 400), then a voice call may initiated with the PSAP (block 410). For example, as shown in FIG. 1, mobile station 110 may initiate a voice call 190 with PSAP 120 via network 130. Voice call 190 may be established between mobile station 110 and PSAP 120 using existing call switching techniques.

The Minimum Set of Data (MSD) may be obtained (block 420). The MSD, set forth in CEN TS15722:2008, specifies the information to be contained in the data message that is sent to the PSAP during an eCAll. The MSD may include a message identifier, an activation type (e.g., manual/automatic activation), a vehicle type (car/truck), a vehicle identification (make and model), a type of vehicle engine, a time, a geographic location of the vehicle, a direction the vehicle was traveling, and/or a number of passengers. The MSD may include one or more of the above-noted types of data. The MSD may further include other types of data not set forth above. For example, if mobile station 110 is not associated with a vehicle, the MSD may relate solely to mobile station 110 (e.g., a geographic location of mobile station 110, etc.). Some of the data of the MSD may be stored in memory 215, or may be obtained externally via network 130. The geographic location data of the MSD may be obtained, for example, via a GPS device that obtains a highly accurate geographic location of mobile station 110 or of a vehicle with which mobile station 110 is associated. Other techniques for obtaining the geographic location data may, alternatively, be used. In the messaging diagram of FIG. 5, mobile station 110 is depicted as obtaining the MSD 500.

Figure 5:
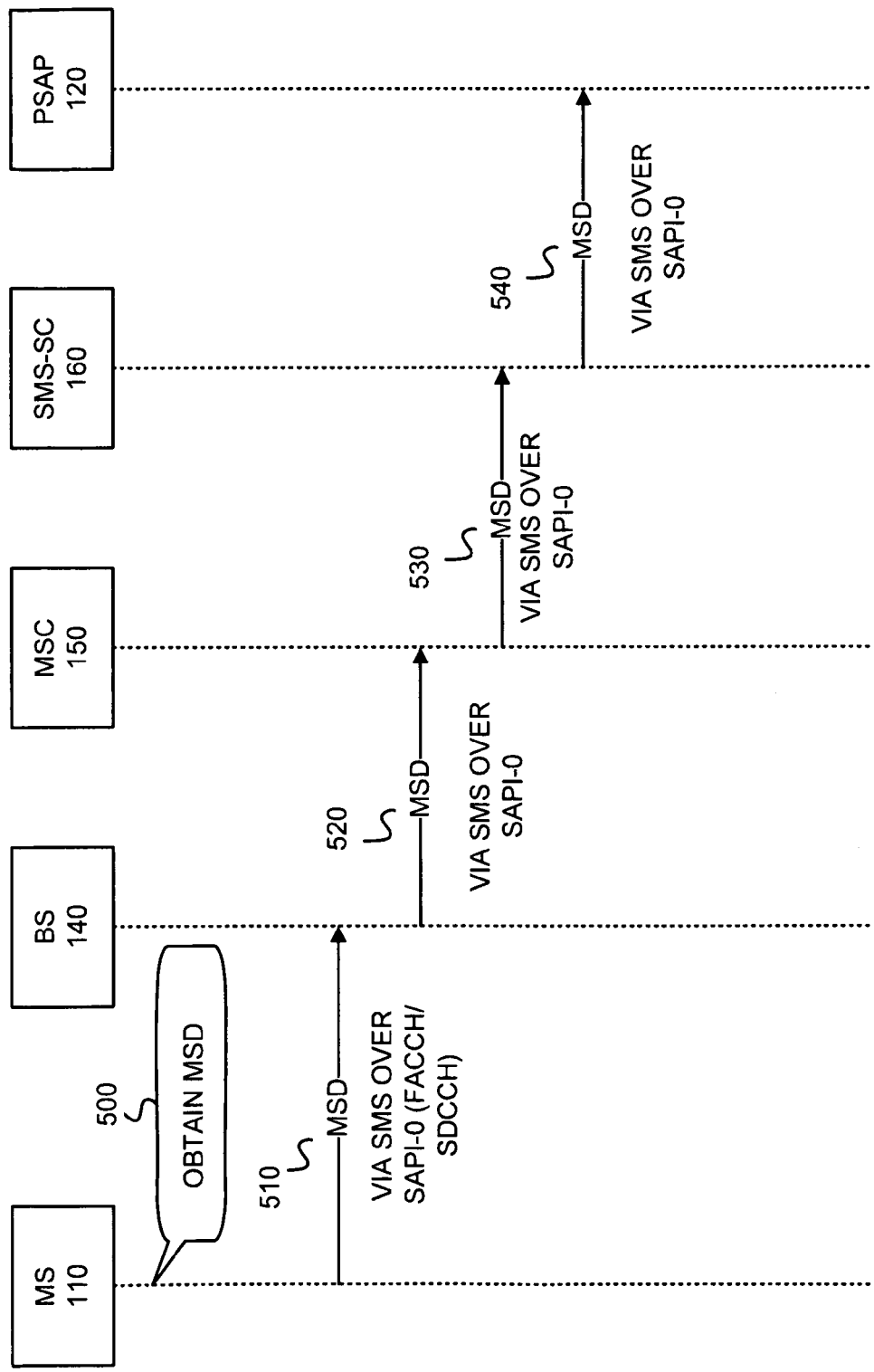
FIG. 5 is a message diagram associated with the exemplary process of FIG. 4.
Figure 6:
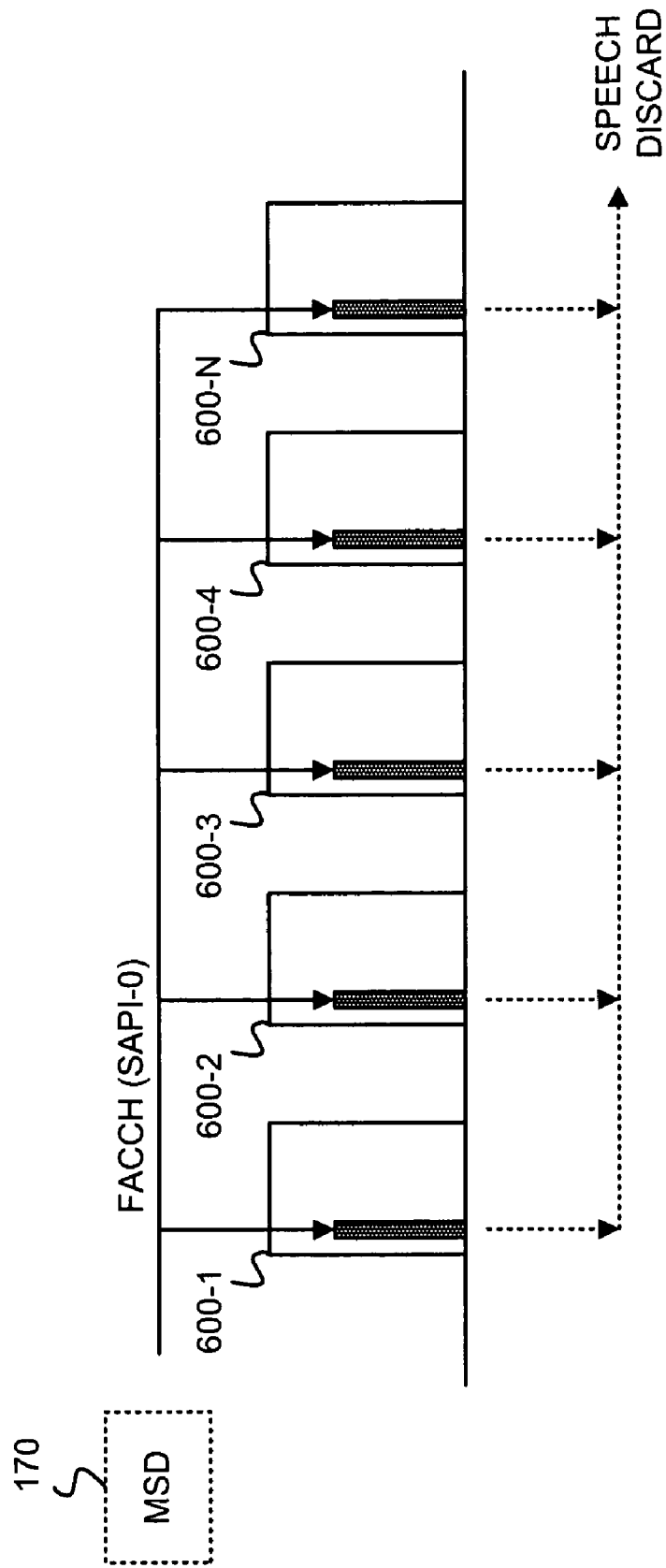
FIG. 6 depicts an exemplary implementation in which the MSD is transmitted via SMS over service access point identifier 0 (SAPI-0) using the fast associated control channel.

The MSD may be routed via SMS over SAPI-0 towards the PSAP (block 430). Mobile station 110, in conjunction with base station 140 and MSC 150, may route the MSD data towards PSAP 120 using SMS over the service access point SAPI-0. FIG. 5 depicts, at 500, 510, 520, 530 and 540, the MSD being obtained by mobile station 110 and routed towards PSAP 120 via BS 140, MSC 150 and SMS-SC 160. FIG. 6 further depicts the exemplary implementation in which MSD 170 is sent via SMS over SAPI-0 on the FACCH channel. The FACCH channel is used over a traffic channel (TCH) of the mobile network where the FACCH channel "steals" times slots from the TCH. FIG. 6 depicts speech frames being "stolen" (e.g., voice frames being discarded) and MSD 170 being inserted within frames of sequential traffic channel bursts 600-1 through 600-N. Transmission of the MSD via SMS and SAPI-0 on the FACCH channel results in more reliable delivery and minimizes transmission delays. In another implementation (not shown), the MSD may be routed via SMS and SAPI-0 on the SDCCH channel.

Referring back to FIG. 4, a determination may be made whether there was a delivery failure at the SMS service center (SMS-SC) (block 440). For example, SMS-SC 160 may not return an acknowledgement that SMS-SC 160 was able to forward the MSD 170 to PSAP 130. As another example, SMS-SC 160 may return a delivery failure indication (e.g., a negative acknowledgement). The delivery failure may include, for example, receiving no answer from PSAP 120 for a specified period of time. If there was a delivery failure at the SMS SC (YES—block 440), the MSD may be re-routed via SMS over SAPI-3 (SACCH) towards the PSAP (block 450) and the exemplary process may end. MSD 170 may be re-routed via SMS over SAPI-3 (SACCH) either at mobile station 110, or at MSC 150, based on an indication of a delivery failure from SMS-SC 160.

The exemplary operations of FIG. 4 may be selectively repeated for each eCall from mobile station 110.

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIG. 4, the order of the blocks may be modified in other implementations consistent with the principles of the invention. Further, non-dependent blocks may be performed in parallel.

Implementations have been described herein with respect to sending MSD data associated with an eCall to a PSAP via SMS over SAPI-0 (FACCH/SDCCH). However, the implementations described herein may be applied generally to sending any type of data (e.g., other than MSD) from a source node to a destination node via SMS over SAPI-0 (FACCH/SDCCH) in a mobile network. Additionally, the voice call may not relate or correspond to an eCall.

Aspects described herein may also be implemented in methods and/or computer program products. Accordingly, the invention may be embodied in hardware and/or in software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement the embodiments described herein is not limiting of the invention. Thus, the operation and behavior of the embodiments were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented in a mobile station, comprising:
receiving, at a processing unit of the mobile station, data for sending to a destination device;
sending, via a transceiver of the mobile station, the data to the destination device via short message service (SMS) over service access point identifier 0 (SAPI-0) of a Global System for Mobile communications (GSM) mobile network, where SAPI-0 comprises a service access point associated with a data link layer of a Third Generation Partnership Project (3GPP) GSM mobile network, where the mobile station is associated with a vehicle; and
initiating a voice call to the destination device, wherein the data comprises a minimum set of data including a geographic location data associated with the mobile station, wherein the voice call comprises an emergency call and wherein the destination device comprises a public safety answering point (PSAP).

2. The method of claim 1, further comprising:
establishing, via the transceiver of the mobile station, the voice call with the destination device.

3. The method of claim 1, where the geographic location data comprises Global Positioning System (GPS) location data.

4. The method of claim 1, further comprising:
determining if a response, to sending the data via SMS, is received from a short message service center (SMS-SC); and
sending the data to the destination device via SMS over SAPI-3 of the mobile network if the response has not been received, where SAPI-3 comprises a different service access point associated with the data link layer of the mobile network.

5. The method of claim 4, where sending the data via SMS over SAPI-3 to the destination device further comprises:
sending the data via SMS over SAPI-3 to the destination device via a slow associated control channel (SACCH) or via a stand-alone dedicated control channel (SDCCH).

6. The method of claim 1, where sending the data to the destination device via SMS over SAPI-0 further comprises:
sending the data via a fast associated control channel (FACCH).

7. The method of claim 1, where sending the data to the destination device via SMS over SAPI-0 further comprises:
sending the data via a stand-alone dedicated control channel (SDCCH).

8. A mobile station, comprising:
a transceiver; and
a processing unit to:
receive data for sending to a destination device;
determine whether to send the data to the destination device via either short message service (SMS) over service access point identifier 0 (SAPI-0) or SMS over SAPI-3, where SAPI-0 and SAPI-3 comprise different service access points associated with a data link layer of a mobile network;
selectively send, via the transceiver, the location information to the destination device via either SMS over SAPI-0, or via SMS over SAPI-3, based on the determination; and
initiate a voice call to the destination device,
where the mobile station is associated with a vehicle, where the data comprises a Minimum Set of Data (MSD) including a geographic location data associated with the mobile station, wherein the voice call comprises an emergency call and where the destination device comprises a public safety answering point (PSAP).

9. The mobile station of claim 8, where the processing unit is further configured to:
establish, via the transceiver of the mobile station, the voice call with the destination device.

10. The mobile station of claim 8, where the geographic location data comprises Global Positioning System (GPS) location data.

11. The mobile station of claim 8, where, when determining whether to send the location information to the PSAP via either SMS over SAPI-0 or SMS over SAPI-3, the processing unit further:
determines if a response, to sending the data via SMS, is received from a short message service center (SMS-SC), and
sends the data to the destination device via SMS over SAPI-3 of the mobile network if the response has not been received, where SAPI-3 comprises a different service access point associated with the data link layer of the mobile network.

12. The mobile station of claim 11, where, when sending the data via SMS over SAPI-3 to the destination device, the processing unit further:
sends the data via SMS over SAPI-3 to the destination device via a slow associated control channel (SACCH) or a stand-alone dedicated control channel (SDCCH).

13. The mobile station of claim 8, where, when sending the data via SMS over SAPI-0 to the destination device, the processing unit further:
sends the data via a fast associated control channel (FACCH).

14. The mobile station of claim 8, where, when sending the data via SMS over SAPI-0 to the destination device, the processing unit further:
sends the data via a stand-alone dedicated control channel (SDCCH).

15. The mobile station of claim 8, where the mobile network comprises a Third Generation Partnership Project (3GPP) Global System for Mobile communication (GSM) network.

16. The method of claim 1, wherein sending the MSD further comprises sending the MSD responsive to a sensed collision of the vehicle.

17. The mobile station of claim 8, wherein the processing unit is further configured to send the MSD responsive to a sensed collision of the vehicle.

18. The method of claim 1, where the MSD further comprises at least one of a type of the vehicle, an identifier of the vehicle, a type of engine of the vehicle, a geographic location associated with the vehicle, a direction of the vehicle, and a number of passengers in the vehicle.

19. The mobile station of claim 8, where the MSD further comprises at least one of a type of the vehicle, an identifier of the vehicle, a type of engine of the vehicle, a geographic location associated with the vehicle, a direction of the vehicle, and a number of passengers in the vehicle.

* * * * *

UNITED STATES PATENT AND TRADEMARK OFFICE
CERTIFICATE OF CORRECTION

PATENT NO. : 8,351,973 B2
APPLICATION NO. : 12/482772
DATED : January 8, 2013
INVENTOR(S) : Johannesson et al.

It is certified that error appears in the above-identified patent and that said Letters Patent is hereby corrected as shown below:

In Column 4, Line 60, delete "Mobile station 120" and insert -- Mobile station 110 --, therefor.

Signed and Sealed this
Second Day of April, 2013

Teresa Stanek Rea
*Acting Director of the United States Patent and Trademark Office*